Dec. 25, 1951  J. E. POPMA  2,579,961
PHOTOGRAPHIC FINGERPRINTING DEVICE
Filed Jan. 2, 1951  3 Sheets-Sheet 1

INVENTOR.
JEWETT EUGENE POPMA
BY
ATTORNEY

Dec. 25, 1951 J. E. POPMA 2,579,961
PHOTOGRAPHIC FINGERPRINTING DEVICE
Filed Jan. 2, 1951 3 Sheets-Sheet 2
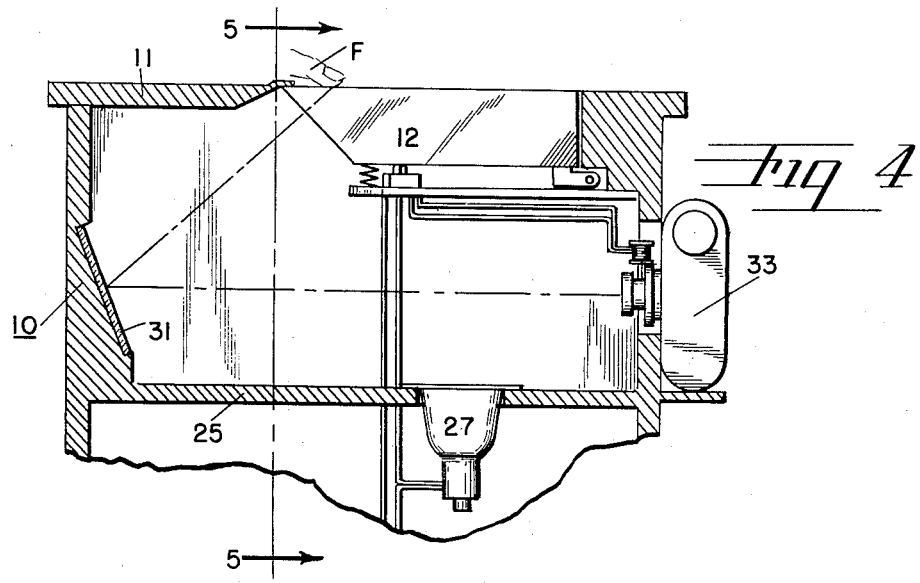
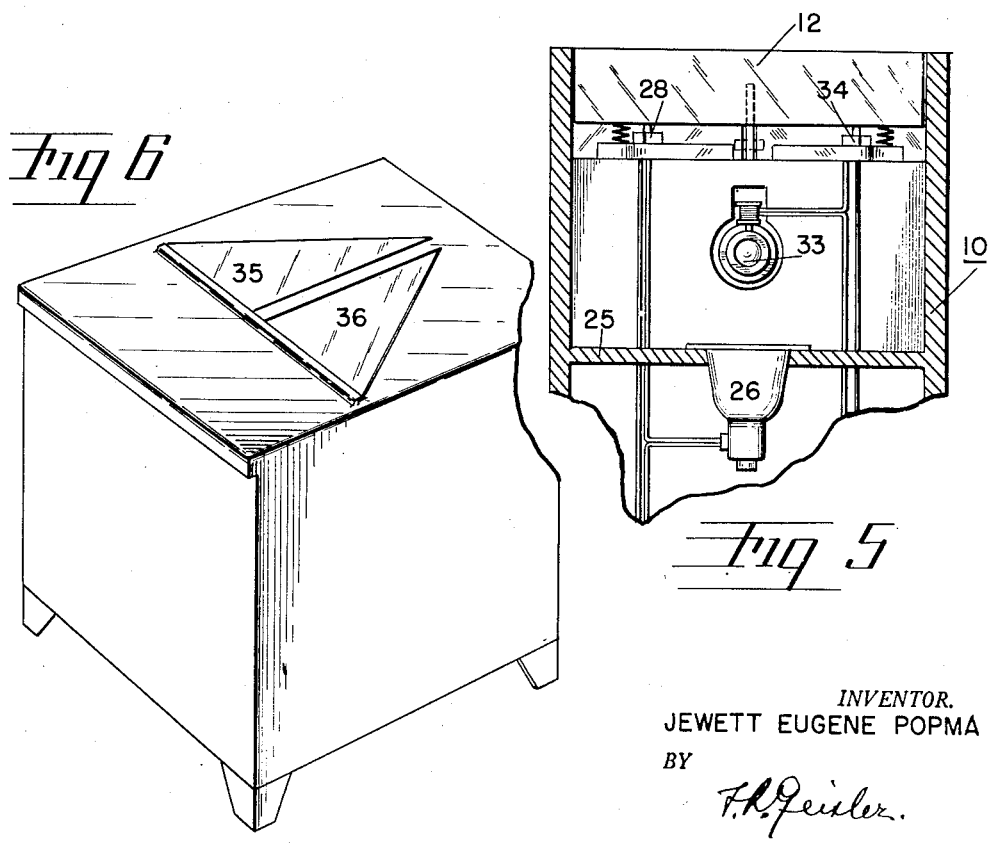
INVENTOR.
JEWETT EUGENE POPMA
BY
ATTORNEY

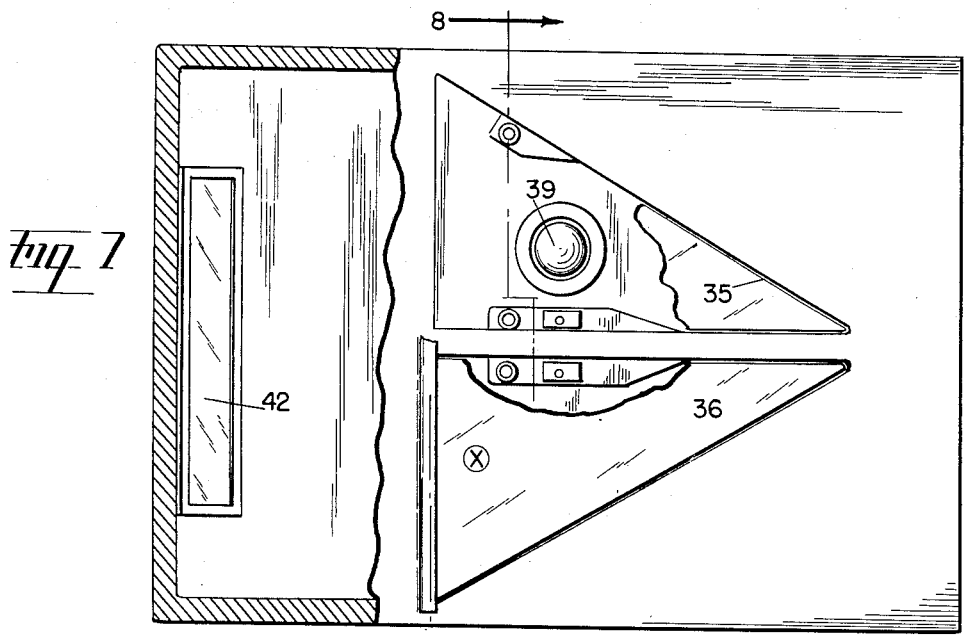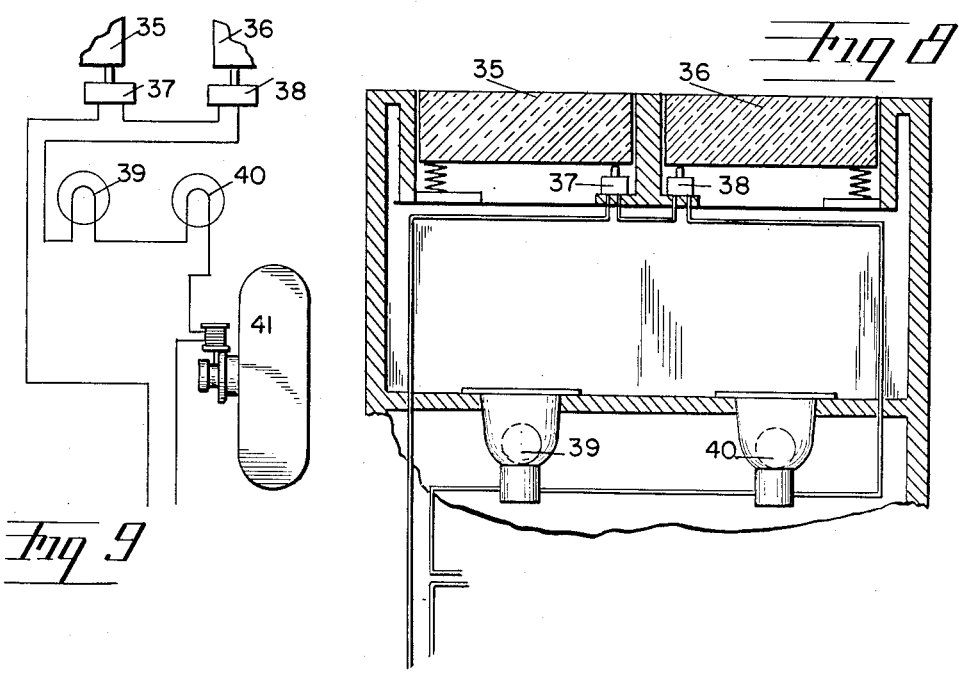

Patented Dec. 25, 1951

2,579,961

UNITED STATES PATENT OFFICE 2,579,961

PHOTOGRAPHIC FINGERPRINTING DEVICE

Jewett Eugene Popma, Portland, Oreg.

Application January 2, 1951, Serial No. 203,916

9 Claims. (Cl. 88—24)

This invention relates to the photographing of finger prints and the like and is a continuation in part of my application Serial No. 49,870, filed under date of September 18, 1948, and entitled "Finger Print Photographing Device," now abandoned.

The invention has for its object the providing of improved means for photographing finger prints which will insure a clear and accurate photographic reproduction of the ridges and valleys of the skin contour of that particular skin area which is being photographed.

A difficulty heretofore incurred with the photographing of finger prints, where the finger is pressed against the glass during the photographing, has been that variation of the pressure of the finger affects the photographic results. Thus, for example, if the person whose finger print is being photographed fails to maintain the pressure of the finger against the glass during the instant the picture is being taken, the finger print photograph may be so indistinct as to be of no value. A specific object of the invention accordingly is to provide an improved finger print photographing device in which the photograph will be taken only when the proper finger pressure against the glass, or other transparent medium, is maintained.

It is often desirable to obtain two separate finger print reproductions simultaneously. For example, in maternity hospitals it is now customary to obtain an imprint of a baby's foot or palm for the purpose of identification and to attach thereto a finger print of the mother. A further object of the present invention is to provide an improved finger print photographing device in which the two photographic reproductions can be made simultaneously and side by side in the same photograph, thus providing the desired record in a single operation and preventing any possibility of attaching the wrong photographs together.

An additional object of the invention is to provide a finger print photographing device capable of making two such photographic reproductions simultaneously in the same photograph in which the photograph will be taken only when the desired pressure is exerted by both skin areas against the glass or other medium, thus insuring that in both reproductions appearing in the photograph the ridges and valley lines of the skin areas will be clear and distinct.

A further object of the invention is to provide an improved device for photographing finger prints in which the ridges and valleys of the skin surface will be made to stand out more sharply and more distinctly in the finished photograph than has heretofore been the case with finger print photographs.

With these objects and other advantages in view, the invention consists in the construction, arrangement and combination of the parts composing my improved photographic finger printing device as hereinafter described with reference to the accompanying drawings, in which:

Fig. 4 is a vertical section similar to Fig. 2 but illustrating a slight modification in the device of Figs. 1 and 2;

Fig. 5 is a sectional elevation taken on line 5—5 of Fig. 4;

Fig. 6 is a perspective view of a further modified form in which my device may be made;

Fig. 7 is a top plan view of the device of Fig. 6, drawn to a larger scale, and with portion of the top of the device shown broken away for the sake of clarity;

Fig. 8 is a sectional elevation on line 8—8 of Fig. 7; and

Fig. 9 is a wiring diagram of the device illustrated in Figs. 6, 7 and 8.

Figure 1:
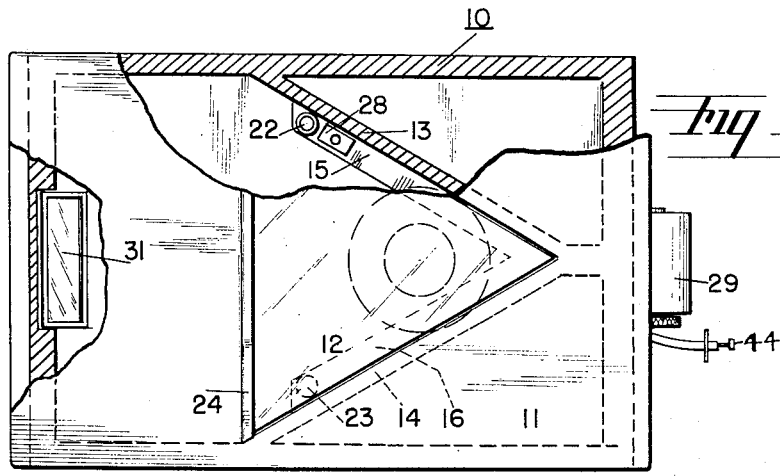
Fig. 1 is a top plan view of one form in which my improved finger print photographing device may be made, with part of the top portion of the device shown broken away.
Figure 2:
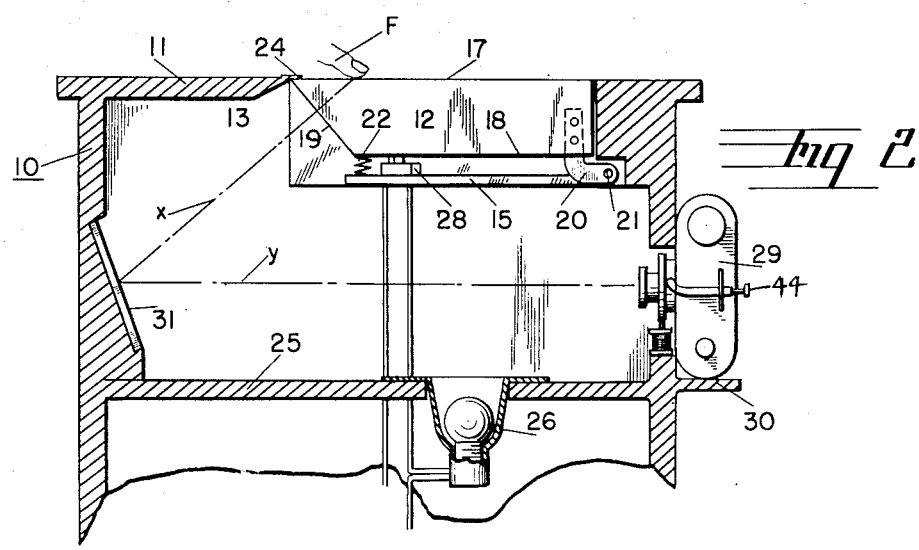
Fig. 2 is a vertical section on line 2—2 of Fig. 1.

Referring first to Figs. 1 and 2, the device illustrated includes a cabinet or housing, indicated in general by the reference character 10 and having a top plate or deck 11. A triangularly shaped opening is provided in the top plate 11 to accommodate a similarly shaped slab of glass 12. A pair of converging, horizontal ribs 13 and 14 are positioned below two edges of the opening in the top plate 11 and constitute downwardly-extending vertical walls for a short distance below the opening at the corresponding sides. Horizontal flanges 15 and 16 are provided at the bottom of the ribs 13 and 14 respectively to provide support for certain elements mentioned later.

The slab of glass 12 has a top face 17 (Fig. 2) which preferably is normally flush with the top surface of the top plate 11. The glass has a bottom face 18, which is shown as parallel to the top face 17 although it need not necessarily be parallel thereto, and the glass also has two converging vertical side walls, preferably, though not necessarily, perpendicular to the top face 17, and a front wall 19 which is inclined at an acute angle (preferably approximately 45°) with respect to the top face 17.

Figure 3:
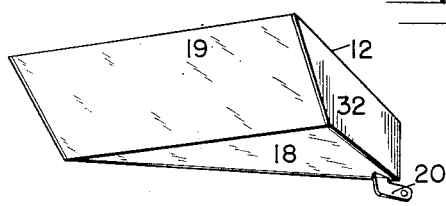
Fig. 3 is a perspective view of the glass slab used in the device of Figs. 1 and 2.

A hinge arm 20 (Figs. 2 and 3) is secured to the glass slab in any suitable manner near the convergence of the two side walls, for example, by having one end cemented in a cavity provided in the glass slab, and this hinge arm 20 is mounted on a horizontal hinge pin 21 secured in a recess in the converging ribs 13 and 14. Thus the hinge mounting in the rear of the glass slab 12 permits downward swing of the glass slab with respect to the top deck 11.

The glass slab 12 is held normally in the raised position shown in Fig. 2, with its top face 17 flush with the top plate 11 of the housing, by a pair of coil springs 22 and 23. The bottom ends of the coil springs 22 and 23 rest on the flanges 15 and 16 respectively, and the upper ends of the coil springs engage the bottom surface of the glass near the front. A thin metal strip 24 on the top plate 11 extends slightly over the front edge of the glass 12 in order to prevent the glass from being pushed up too high by the coil springs 22 and 23 and aids in holding the top face 17 of the glass normally in approximately the same horizontal plane as the top face of the top plate 11.

A shelf 25 (Fig. 2) located in the housing or cabinet 10 a spaced distance below the glass and top plate, has an opening located below the center portion of the glass 12 and in this opening a light-reflecting shield 26 is mounted. The shield is connected at the bottom to an electric light socket for an electric lamp 27. Thus the rays of light from the lamp 27 will be directed upwardly to the glass 12 and cause the glass to be illuminated whenever the circuit to the lamp is closed. The lamp circuit is controlled by a spring push button switch 28 (Figs. 1 and 2) which is mounted on the flange 15 beneath the corresponding side of the glass and near the front wall of the glass, and this push button switch is so arranged that when the glass is in its normal raised position, the switch will not be closed by the glass but a slight downward movement of the front portion of the glass against the force of the coil springs 22 and 23, such as would be occasioned by pressure of a finger on the forward portion of the glass, will cause the glass to press the push button switch and thereby close the circuit to the lamp 27 and cause the lamp to be lighted. Release of the pressure on the glass, permitting the glass to return to its normal raised position, will immediately disconnect the lamp 27.

A camera, indicated at 29 in Figs. 1 and 2, is shown mounted on the outside of the rear wall of the housing 10, supported on a bracket or shelf 30, with the eye of the camera extending through an opening in the housing wall, as shown in Fig. 2. A mirror 31 is mounted within the housing inside the front wall of the housing, approximately in the position shown in Figs. 1 and 2, and is inclined in such manner that light rays reaching the mirror from the front wall 19 of the glass will be reflected to the eye of the camera 29. The camera of Figs. 1 and 2 is provided with the customary manually-operated push button shutter control 44.

In the finger print photographing operation, the finger tip F from which the photograph finger print reproduction is to be made is centrally placed on the top face of the glass near the front edge, substantially in the position indicated in Fig. 2. When downward pressure is exerted by the finger tip in this position, causing the circuit to the lamp 27 to be closed, some of the light passing up through the glass will reach the area in the top surface of the glass where the finger tip F is pressed against the glass and some of these rays will be reflected downwardly through the front wall 19 of the glass in the direction indicated by the line $x$. These rays, striking the mirror 31, will be reflected and directed to the eye of the camera 29 in the direction indicated by the line $y$. If, while the finger tip is pressing downwardly on the glass and causing the lamp 27 to be turned on, the operator presses the shutter control 44 of the camera, the desired picture will be obtained. If the finger tip F is not pressed against the top face of the glass when the picture is being taken, the finger print photograph will either result in an indistinct photograph of a reduced portion of the finger tip area desired, or will show nothing at all. The operator accordingly takes a picture only when the light is on and thus only when proper pressure of the finger is exerted against the glass.

It would of course be possible to carry out my invention with the camera 29 placed in some other position. Thus, for example, the camera could be placed in the cabinet or housing at the location of the mirror 31 and so arranged that the camera would be perpendicular to the line $x$. In other words, the line $x$ would be the axis of the cone of light entering directly into the eye of the camera, and the camera in such case could be manually operated by means located on the outside of the cabinet or housing. Generally however, I have found it more convenient when my device is made in the manner so far described, to have the camera positioned on the outside of the cabinet so that the camera can be reloaded more easily. In any case the angle at which the line $x$ (Fig. 2) passes through the glass must be such that the resulting angle of incidence will be greater than the critical angle of incidence for that particular medium, which produces total reflection.

I have discovered that if the two converging side walls of the glass slab 12 are covered with a dark, light-absorbing coating, the resulting finger picture will be considerably improved inasmuch as the contrast between the skin ridges and the valleys between the ridges on the skin surface will be brought out more sharply in the picture due to the intensifying of the blackness of the valleys between the illuminated skin ridges. The top face of the illuminated glass, when viewed through the front wall 19 (and thus as appearing in the camera), will appear to be dark. When a finger is pressed against the top surface the skin ridges are brightly illuminated, but the valleys between the ridges in the skin remain dark. If a black, light-absorbing coating is placed over the side walls of the glass the darkness of the top face of the glass, as viewed through the front wall, appears intensified. Thus the blackness of the valleys between the illuminated skin ridges becomes intensified when a substantial portion of the glass slab is covered with a light-absorbing coating. Such a coating on one of the side faces of the glass slab is shown at 32 in Fig. 3.

I have shown the camera 29 in Figs. 1 and 2 as manually operated. However, if desired, the operation of the camera as well as the lighting of the lamp 27 can also be made to take place automatically by the pressing of the finger down on the glass. In the modification shown in Figs. 4 and 5, a second push button switch 34, similar to the push button switch 28, is similarly positioned beneath the other side of the glass as shown most clearly in Fig. 5. The camera 33 is operated electrically in this case and the push button switch 34 is connected in the circuit to an electrical operating mechanism for the camera 33 as indicated. Electrical means for operating cameras is well known and need not be described. Thus downward pressure of the finger on the glass will then cause the lamp to be lighted and the camera to take the picture. Without the desired pressure of the finger, neither the light nor the camera will operate. Thus the control of the taking of the finger print photograph becomes entirely automatic.

While I have illustrated the glass slab 12 as being triangular in shape it will be obvious that a rectangular slab of glass, or glass of any other convenient size or shape, could be used in my device. It will also be understood, however, that it is necessary to have the front wall of the glass slab sloped downwardly at a position of angularity with respect to the top surface of the glass against which the finger is pressed. In the event a rectangularly shaped slab of glass is employed, the rear wall of the glass slab is preferably covered with a black, light-absorbing coating. The coating of the side wall of the glass will also improve the resulting picture still further to a slight degree.

In Figs. 6, 7 and 8 a further modified form of my device is illustrated, and in the device of these figures I provide two separate and independent slabs of glass 35 and 36 in place of the single slab 12 previously described. The purpose of the two separate slabs of glass is to enable two separate finger print reproductions to be produced and shown in the same photograph. The two glass slabs 35 and 36 are preferably identical and each of course will have a front wall corresponding to the front wall 19 of the slab 12. Preferably a light is arranged under each glass as indicated by the lamps 39 and 40 of Fig. 8. If the camera is to be placed on the outside of the housing or cabinet in the same relative position as the camera 29 of Fig. 2, a mirror 42 (Fig. 7) is arranged to correspond to the mirror 31.

As mentioned in the introduction to this specification, it is customary to make a photographic reproduction of the print of a baby's foot or palm and of a finger of the baby's mother. My advice when made in the form illustrated in Figs. 6, 7 and 8 enables this to be done very easily. The baby's foot or palm is pressed on one of the glass slabs and the mother's finger is pressed on the other glass slab. In order to insure that there will be sufficient pressure on each of the slabs to make both prints equally clear in the picture, I provide push button switches 37 and 38 (Fig. 8) for the glass slabs 35 and 36 respectively and connect both of these in series with the lamps 39 and 40. Thus neither lamp will be lighted unless both glass slabs are pressed down, whereupon both lamps will light.

It is most convenient, when two prints are to be taken by a single picture in the manner above mentioned, to have the operation of the camera also automatically controlled and this is easily accomplished by providing the camera 41 (Fig. 9) with electrical operating means and connecting this in the same circuit with the lamps 39 and 40. Thus, as indicated by the wiring diagram of Fig. 9, downward pressure of the two glass slabs 35 and 36 will not only cause the lamps 39 and 40 to be lighted but will also cause the camera to take the desired picture.

While I have described my device as employing a glass slab, or a pair of glass slabs, it is to be understood that any suitable transparent solid material may be used in the same manner as plate glass in the carrying out of my invention. Thus, for example, I have found it very satisfactory to use transparent plastic, commonly called "plastic glass." Such transparent plastic has the advantage of being cheaper and lighter in weight than regular plate glass and also has a slightly more advantageous refractive quality. On the other hand, the surface of such transparent plastic or "plastic glass" is more easily scratched and marred than regular plate glass. It is to be understood that the term "glass," as used in the specification and in the claims, includes "plastic glass," or any other solid transparent material having a smooth surface and capable of transmitting and reflecting light rays in the same general manner.

Instead of having the light operated by the pressure on the glass, or the light and camera both operated by such pressure, it would also be possible to have the camera operated alone by the pressure on the glass, or the pressure on both glasses, in which case the light would be turned on manually. Also other means could be employed for operating the camera automatically. For example pneumatic means could be employed for operating the camera shutter, the pneumatic means being actuated by downward movement of the glass slab or the pair of glass slabs. Further minor modifications would be possible within the scope of my invention and it is not my intention to limit my invention otherwise than as set forth in the claims.

I claim:

1. In a photographic finger printing device, a block of glass having a top face and a front wall extending downwardly from said top face and obliquely with respect thereto, a mounting for said block of glass, said mounting including means permitting said block to be pressed downwardly in said mounting, a light positioned below said block of glass, a switch controlling said light and so arranged as to be closed by the downward movement of said block of glass whenever said block is pressed downward in said mounting, and a camera located below said block and arranged for photographing the light rays reflected from said top face of said block down through said front wall.

2. In a photographic finger printing device, a slab of glass having a top face and a front wall oblique to said top face, a mounting for said slab of glass, said mounting including spring means permitting said slab to be pressed downwardly in said mounting, a light positioned below said slab of glass, a camera located below said slab and arranged for photographing the light rays reflected from said top face of said slab down through said front wall, means for automatically operating the shutter of said camera, means actuated by the downward movement of said slab controlling the operation of said shutter-operating means.

3. A photographic finger printing device of the character described including a block of glass having a top face and a front wall extending downwardly at an acute angle with respect to said top face, a mounting for said block of glass, said mounting including means permitting said block to be pressed downwardly in said mounting, a light positioned below said block of glass, a switch controlling said light and so arranged as to be closed by the downward movement of said block of glass whenever said block is pressed downward in said mounting, a camera located below said block and arranged for photographing the light rays reflected from said top face of said block down through said front wall, electric means for operating said camera, a circuit for said electric means, and a second switch controlling said circuit to said electric means and so arranged as to be closed by the downward movement of said block whenever said block is pressed downward in said mounting.

4. In a photographic finger printing device of the character described, a pair of slabs of glass, each slab having a top face and a front wall extending downwardly from said top face and obliquely with respect thereto, a mounting for each of said slabs of glass, said mountings including means permitting said slabs to be pressed downwardly in said mountings, a light positioned below said slabs of glass, a pair of switches in the circuit to said light and controlling said light and so arranged as to be closed by the downward movement of said slabs of glass respectively, whereby downward movement of both of said slabs will close said circuit and cause said light to be lighted, and a camera located below said slabs and arranged for photographing the light rays reflected from said top faces of said slabs down through said front walls.

5. In a photographic finger printing device of the character described, a pair of slabs of glass of similar size and shape, each slab having a top face and a front wall oblique to said top face, a mounting for each of said slabs of glass, said mountings including spring means permitting said slabs to be pressed downwardly in said mountings, a light positioned below each of said slabs of glass, a pair of switches in the circuit to said lights and controlling said lights and so arranged as to be closed by the downward movement of said slabs of glass respectively, whereby downward movement of both of said slabs will close said circuit and cause said lights to be lighted, and a camera located below said slabs and arranged for photographing the light rays reflected from said top faces of said slabs down through said front walls.

6. In a photographic finger printing device of the character described, a pair of slabs of glass of similar size and shape, each slab having a top face and a front wall extending downwardly at an acute angle with respect to said top face, a mounting for each of said slabs of glass, said mountings including means permitting said slabs to be pressed downwardly in said mountings, a light positioned below said slabs of glass, a camera located below said slabs and arranged for photographing the light rays reflected from said top faces of said slabs down through said front walls, means for automatically operating the shutter of said camera and means actuated by the downward movement of both of said slabs controlling the operation of said shutter-operating means.

7. A photographic finger printing device of the character described including, a pair of slabs of glass, each slab having a top face and a front wall extending downwardly at an acute angle with respect to said top face, a mounting for each of said slabs of glass, said mountings including spring means permitting said slabs to be pressed downwardly in said mountings, a light positioned below each of said slabs of glass, a pair of switches in the circuit to said lights and controlling said lights and so arranged as to be closed by the downward movement of said slabs of glass, respectively, whereby downward movement of both of said slabs will close said circuit and cause said lights to be lighted, a camera located below said slabs and arranged for photographing the light rays reflected from said top faces of said slabs down through said front walls, electric means for operating said camera, a circuit for said electric means, and a second pair of switches in said circuit to said electric means and so arranged as to be closed by the downward movement of said slabs respectively, whereby downward movement of both slabs will close said circuit to said electric means and cause said camera to operate.

8. The combination set forth in claim 1 with the addition of a dark, light-absorbing background extending over a substantial portion of said block and absorbing some of the light rays reflected back and forth within said block.

9. The combination set forth in claim 4 with the addition of a dark, light-absorbing background extending over a substantial portion of each of said slabs and absorbing some of the light rays reflected back and forth within each of said slabs.

JEWETT EUGENE POPMA

No references cited.